UNITED STATES PATENT OFFICE

RUDOLPH KRECH, OF MANNHEIM, WILHELM SCHEURER, OF LUDWIGSHAFEN-ON-THE-RHINE, AND ADOLPH KOCH, OF HOCHST-ON-THE-MAIN, GERMANY, ASSIGNORS TO GENERAL ANILINE WORKS, INC., OF NEW YORK, N. Y., A CORPORATION OF DELAWARE

PRODUCTION OF COLORED RUBBER ARTICLES

No Drawing. Application filed June 14, 1932, Serial No. 617,258, and in Germany February 28, 1931.

The present invention relates to the production of colored rubber articles.

We have found that rubber products (which term is meant to include natural rubber as well as the synthetic products which have a constitution and properties similar to those of natural rubber, as for example polymerization products of butadiene hydrocarbons such as butadiene or isoprene) can be colored in very strong and often very bright yellow shades having excellent fastness properties by incorporating with the rubber products or mixtures containing them prior to vulcanization water-insoluble azo dyestuffs of the general formula

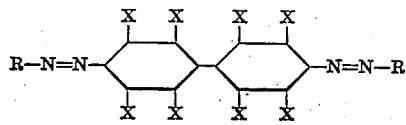

in which one of the X's in each benzene nucleus is a chlorine atom, the other X's being hydrogen or alkyl groups such as for example the methyl group, and wherein R is the radicle of an arylamide of acetoacetic acid. Azo dyestuffs of the said kind may be obtained for example by the action of tetrazotized dichlor-benzidines on aryl derivatives of acetoacetic acid amide; they give greenish to reddish yellow shades as a rule.

By reason of the said dyestuffs being practically insoluble in rubber, they do not bleed when the rubber products are worked up; neither do they give rise to that phenomenon which is known as blushing or efflorescence when the rubber articles are stored. Furthermore they are insoluble in benzine which renders them especially suitable for use in connection with cold vulcanization processes which are advantageously carried out in the presence of benzine. Vulcanization products colored with the said dyestuffs do not give off any of the dyestuff when treated with hot soap solutions.

The following examples will further illustrate the nature of this invention but the invention is not restricted to these examples. The parts are by weight.

Example 1

A rubber mixture is prepared from 100 parts of crepe rubber, 160 parts of calcium carbonate, 50 parts of kaolin, 2.5 parts of petrolatum, 5 parts of zinc white, 0.15 part of diphenyl-guanidine, 1 part of mercapto-benzothiazol disulphide, 1.5 parts of stearic acid, 3 parts of sulphur and 3 parts of the azo dyestuff obtainable by coupling 1 molecular proportion of tetrazotized 3.3'-dichlor-4.4'-diaminodiphenyl with 2 molecular proportions of acetoacetic acid m-xylidide. The mixture is vulcanized in a vulcanization press for 12 minutes at a steam pressure of 3½ atmospheres above atmospheric pressure. The resulting bright yellow vulcanizate may be used for example as a floor covering.

Example 2

A rubber mixture is prepared from 100 parts of crepe rubber, 10 parts of zinc white, 140 parts of calcium carbonate, 43 parts of talc, 3 parts of paraffin wax, 3 parts of sulphur, 0.4 part of stearic acid, 0.6 part of mercapto-benzothiazol disulphide and 2 parts of the azo dyestuff obtainable by coupling one molecular proportion of tetrazotized 2.2'-dichlor-4.4'-diaminodiphenyl with 2 molecular proportions of acetoacetic acid m-xylidide. The mixture is sprayed onto copper wires and then vulcanized by treating with "open" steam for 20 minutes under a pressure of 3 atmospheres above atmospheric pressure.

Example 3

A mixture is prepared from 100 parts of crepe rubber, 2.8 parts of sulphur, 0.4 part of paraffin oil, 3 parts of stearic acid, 2 parts of brown coal tar oil, 2 parts of colophony, 60 parts of calcium carbonate 13.5 parts of zinc white, 4 parts of magnesium oxide, 6 parts of kaolin, 0.4 part of thiuram and 2 parts of the azo dyestuff obtainable by coupling 1 molecular proportion of tetrazotized 2.2'-dichlor-3.3'-dimethyl-4.4'-diaminodiphenyl with 2 molecular proportions of acetoacetic acid inilide. The mixture is vulcanized for 45 minutes in hot air at 120° C. and in this way a vulcanizate is obtained which is suitable for the manufacture of rubber shoes.

*Example 4*

A rubber mixture is prepared from 100 parts of crepe rubber, 40 parts of white factice (rubber oil substitute), 5 parts of lithopone, 2 parts of magnesium oxide and 2 parts of the azo dyestuff obtainable by coupling 1 molecular proportion of tetrazotized 2.2'-dichlor-3.3'-dimethyl-4.4'-diaminodiphenyl with 2 molecular proportions of acetoacetic acid o-chloranilide. This articles are prepared from this mixture and are vulcanized by immersing them for 8 seconds in a solution of 3 parts of sulphur chloride in 97 parts of benzine. The cold vulcanizate thus obtained has a beautiful yellow color.

*Example 5*

A mixture is prepared from 50 parts of crepe rubber, 40 parts of white factice (rubber oil substitute), 2 parts of lithopone and 2 parts of the azo dyestuff obtainable by coupling 1 molecular proportion of tetrazotized 2.'-dichlor-4.4'-diaminodiphenyl with 2 molecular proportions of acetoacetic acid o-toluidide, on the mixing rollers, whereupon the mass is dissolved in benzine. Hot vulcanization products are immersed in this solution whereupon the solvent is allowed to evaporate from the coating and then the latter is vulcanized in the vapors of sulphur chloride. The coatings thus produced have a beautiful yellow coloration.

*Example 6*

A mixture is prepared from 100 parts of crêpe rubber, 2.5 parts of sulphur, 0.35 part of thiuram, 5 parts of zinc white, 0.6 part of ozocerite, 0.5 part of stearic acid and 2 parts of the azo dyestuff obtainable by coupling 1 molecular proportion of tetrazotized 3.3'-dichlor-4.4'-diaminodiphenyl with 2 molecular proportions of acetoacetic acid anilide. The mass is vulcanized in an iron mould in a vulcanization press for 15 minutes at a superatmospheric pressure of 2 atmospheres. The resulting product which has a beautiful yellow color may be used for example for making bathing caps.

*Example 7*

A mixture is prepared from 100 parts of crepe rubber, 50 parts of sulphur, 2 parts of magnesium oxide, 2 parts of mercapto-benzothiazol, 100 parts of titanium dioxide and 5 parts of the azo dyestuff obtainable by coupling 1 molecular proportion of tetrazotized 3.3'-dichlor-4.4'-diaminodiphenyl with 2 molecular proportions of acetoacetic acid o-chloranilide. The mass is vulcanized in a mould by heating for 2½ hours under a steam pressure of 3½ atmospheres above atmospheric pressure. A hard vulcanizate having a beautiful yellow shade is obtained.

Similar results are obtained by employing, instead of the dyestuffs referred to in the foregoing examples, dyestuffs which are derived from a tetrazotized benzidine of the kind specified and acetoacetic acid alpha- or beta-naphthylamide.

What we claim is:—

1. The process of producing colored rubber products which comprises mixing a rubber product with a water-insoluble azo dyestuff corresponding to the general formula:

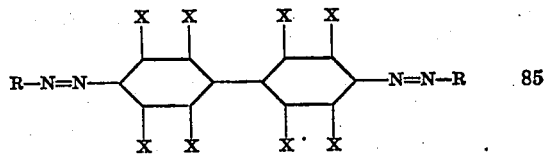

wherein one of the X's in each benzene nucleus is a chlorine atom, the other X's being hydrogen or alkyl, and wherein R is the radicle of an arylamide of acetoacetic acid, and then vulcanizing the mixture.

2. Colored rubber products containing a water-insoluble azo dyestuff of the general formula:

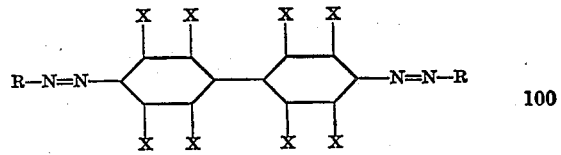

wherein one of the X's in each benzene nucleus is a chlorine atom, the other X's being hydrogen or alkyl, and wherein R is the radicle of an arylamide of acetoacetic acid.

3. Colored rubber products containing a water-insoluble azo dyestuff of the general formula:

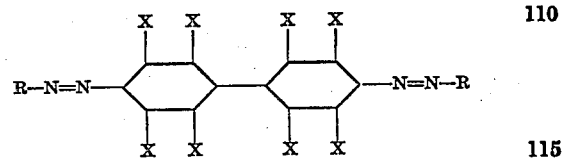

wherein one of the X's in each benzene nucleus is a chlorine atom, the other X's being hydrogen or methyl, and wherein R is the radicle of an amide of acetoacetic acid substituted in the amino group by a radicle of the benzene series.

4. Colored rubber products containing a water-insoluble azo dyestuff derived from a 2.2'-dichlorbenzidine and an acetoacetic acid arylamide.

5. Colored rubber products containing a water-insoluble azo dyestuff derived from a 2.2'-dichlorbenzidine and an acetoacetic acid amide substituted in the amino group by a radicle of the benzene series.

6. Colored rubber products containing a water-insoluble azo dyestuff derived from 2.2'-dichlor-3.3'-dimethylbenzidine and an acetoacetic acid amide substituted in the amino group by a radicle of the benzene series.

7. Colored rubber products containing a water-insoluble azo dyestuff derived from a 3.3'-dichlorbenzidine and an acetoacetic acid arylamide.

8. Colored rubber products containing a water-insoluble azo dyestuff derived from a 3.3'-dichlorbenzidine and an acetoacetic acid amide substituted in the amino group by a radicle of the benzene series.

9. Colored rubber products containing a water-insoluble azo dyestuff derived from 3.3'-dichlorbenzidine and acetoacetic acid m-xylidide.

In testimony whereof we have hereunto set our hands.

RUDOLPH KRECH.
WILHELM SCHEURER.
ADOLPH KOCH.